Nov. 23, 1943.  C. G. STRANDLUND  2,334,888
PLOW
Filed April 2, 1941
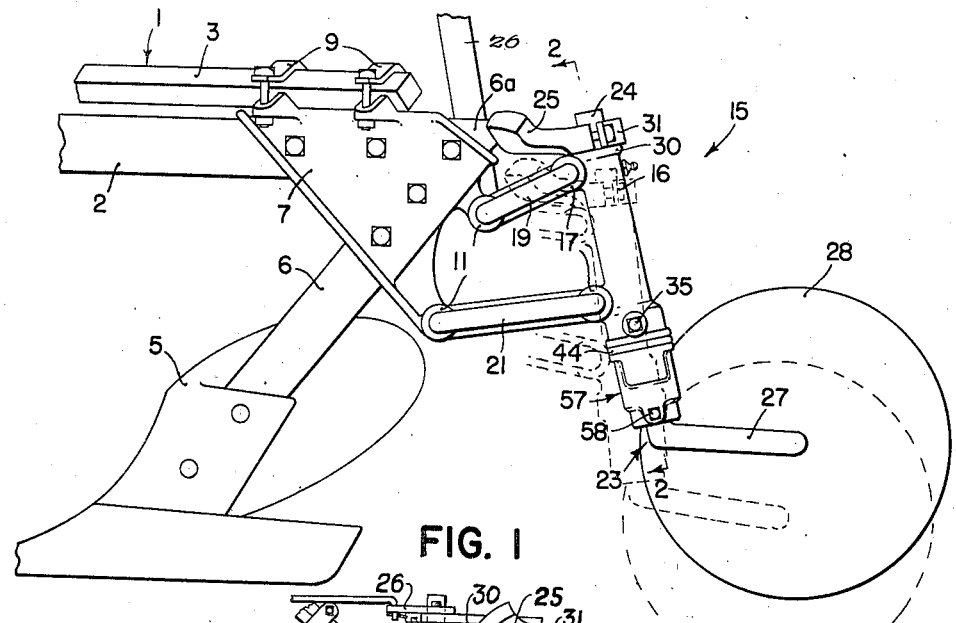
FIG. 1
FIG. 5
FIG. 3
FIG. 2
FIG. 4
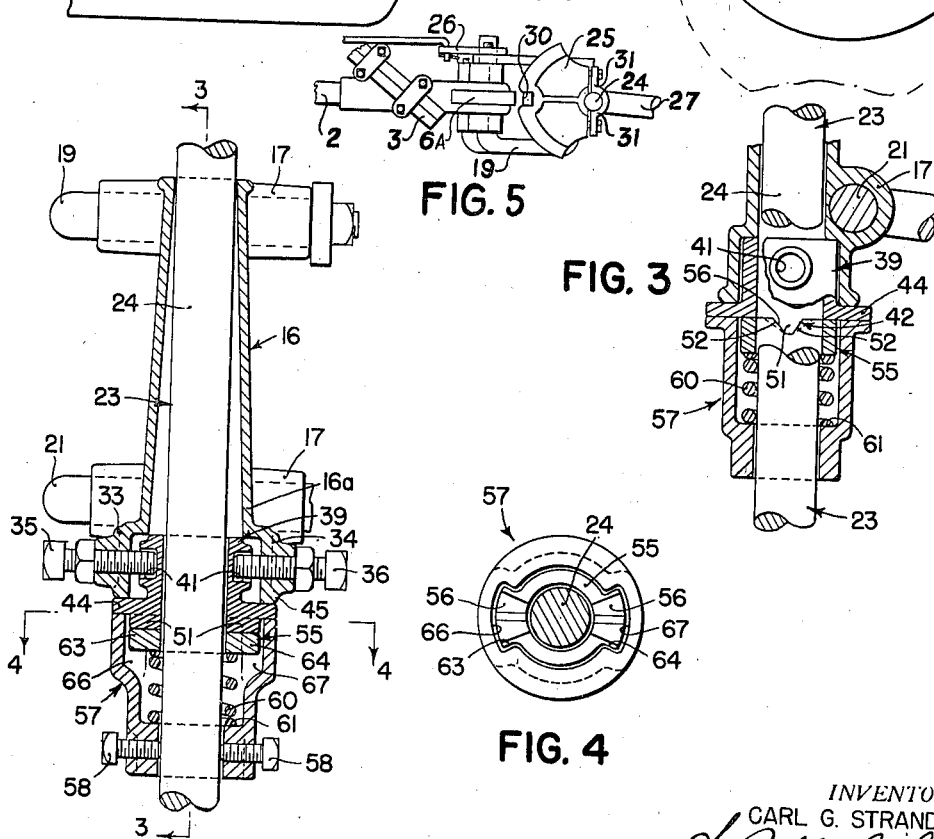
INVENTOR:
CARL G. STRANDLUND
BY
ATTORNEYS.

Patented Nov. 23, 1943

2,334,888

UNITED STATES PATENT OFFICE 2,334,888

PLOW

Carl G. Strandlund, Moline, Ill., assignor to Deere & Company, Moline, Ill., a corporation of Illinois Application April 2, 1941, Serial No. 387,183

21 Claims. (Cl. 97—127)

The present invention relates generally to agricultural machines and more particularly to ground working tools carried upon one or more wheel supports. More particularly, the present invention is concerned with new and improved supporting means for plows and like implements, especially those which are supported on a rear caster wheel, the castering of which is prevented when in plowing position but is permitted when in transport position to facilitate making short turns.

The object and general nature of this invention is the provision of a new and improved wheel support for plows and other agricultural machines, in which, when the implement is in its transport position, the rotation of the wheel spindle is yieldingly resisted, whereby the ground wheel is normally held in a given position, but which may be turned into another position upon the exertion of sufficient force. This tends to keep the implement from swinging back and forth during transport, as sometimes occurs when the rear furrow wheel is permitted to caster freely in transport position, but when a turn is to be made the holding means yields and permits the wheel to caster. More particularly, it is a feature of this invention to provide an arrangement of this kind in which no axial movement of the wheel spindle is required, and still further, it is a feature of this invention to provide means to resist rotation of the wheel spindle, the moving parts of which means are enclosed to keep out dirt, dust and the like, which otherwise would interfere with the proper response of the mechanism to those forces which it is desired to accommodate by permitting the wheel spindle to turn.

These and other objects and advantages of the present invention will be apparent to those skilled in the art after a consideration of the following detailed description, taken in conjunction with the accompanying drawing, in which Figure 1 is a side view of the rear portion of a plow in which the principles of the present invention have been incorporated;

Figure 2 is an enlarged section taken generally along the line 2—2 of Figure 1;

Figure 3 is a section taken along the line 3—3 of Figure 2;

Figure 4 is a section taken along the line 4—4 of Figure 2; and

Figure 5 is a plan view of the notched sector that is fixed to the upper end of the rear wheel spindle and associated parts, the plow being in its raised position (dotted lines, Figure 1).

Referring now to the drawing, the reference numeral 1 indicates the frame of a plow, the frame preferably including one or more longitudinal frame bars 2 and a diagonal brace bar 3. At the rear end of each of the longitudinally extending beams 2 a plow bottom 5 is supported by means of a generally vertically extending shank 6, the lower end of which is fastened to the plow bottom in any suitable manner and the upper end of which is received within a generally vertically disposed socket portion of a bracket member 7, the latter also having a socket section to receive the rear end of the longitudinal beam 2. The upper end of the standard 6 has an extension 6a, the purpose of which will appear later, and the bracket member 7 carries suitable clamps 9 by which the rear end of the diagonal brace bar 3 is clamped to the bracket 7. The latter is also provided with a pair of vertically spaced transverse sleeve sections 11.

The rear wheel support for the plow is indicated in its entirety by the reference numeral 15 and includes a generally vertically disposed sleeve member 16 having transverse sleeve sections 17. A pair of link members 19 and 21 are disposed in the sleeve sections 11 and 17 and serve as means swingably connecting the sleeve member 16 with the rear of the frame bracket 7. A wheel spindle, indicated in its entirety by the reference numeral 23, is journaled for rocking movement in the sleeve member 16 and includes a generally vertically disposed spindle portion 24, the upper end of which extends outwardly from the upper end of the sleeve member 16 and carries a locking sector 25 which is notched, as at 30 (Figure 5), so as to embrace the standard extension 6a when the plow is in operating position, shown in full lines in Figure 1, and thereby lock the wheel spindle 23 against rotation in the sleeve member 16. However, when the plow is lifted to its transport position, which is done by swinging an arm 26 that is fixed to or forms a part of the link 19 rearwardly, the sleeve 16 and wheel spindle 23 swing downwardly relative to the plow beam 3 into the position shown in Figure 1 in dotted lines, thus raising the plow. This separates the sector 25 from the end 6a of the standard 6 so that the wheel spindle 23 is now free to caster. The rear wheel support 15 is per se similar to that shown in my prior patent, No. 2,179,526, issued November 14, 1939, to which reference may be made if necessary.

The wheel spindle 23 includes a rearwardly extended portion 27 on the laterally turned end of which a rear furrow wheel 28 is journaled for rotation. It will be noted that the wheel 28 is disposed rearwardly of the axis defined by the vertical spindle section 24, and therefore when the plow is in its transport position and the sector 25 is disengaged from the beam end 6a, the wheel 28 tends to caster, that is, swing from one side to the other about the axis defined by the spindle section 24. Normally when moving across the field in transport position and in a straight line it is not desired to permit the wheel 28 to caster, for this interferes with the stability of the implement. However, when turning a corner, or when turning around at the headlands with the plow in transport position, it is necessary, of course, to permit the wheel 28 to caster. The transport position of the rear wheel support 15 is shown in dotted lines in Figure 1.

The present invention is particularly concerned with means for yieldingly restraining the free swinging of the rear wheel when the plow is raised, and such means will now be described.

The sleeve member 16 is provided at its upper end with a beaded edge 30 against which the locking sector 25 bears. The locking sector 25 is firmly clamped to the upper end of the wheel spindle 23 by any suitable means, such as a clamping member 31. Being firmly fixed to the upper end of the wheel spindle 23, the locking sector 25 serves as means preventing the downward displacement of the wheel spindle relative to the sleeve member 16. As best shown in Figure 2, the lower end of the sleeve member 16 is formed to flare outwardly and downwardly, as indicated at 16a, and this is to provide for a limited amount of lateral swinging of the wheel spindle 23 in the sleeve member 16. The lower end of the sleeve member 16 is provided with a pair of diametrically opposed bosses 33 and 34 which are tapped to receive a pair of adjusting set screws 35 and 36. Disposed about the spindle 23 adjacent the lower end of the sleeve member 16 is a collar 39 which has a pair of recesses 41 to receive the inner ends of the set screws 35 and 36 and whose lower portion is formed as a cam section, as indicated by the reference numeral 42 in Figure 3. Also, the collar 39 has a radially outwardly extending flange section 44 which normally bears against the lower edge 45 of the sleeve member 16. By screwing either of the set screws 35 and 36 in and at the same time backing the opposite set screw outwardly, the lower end of the spindle 23 can be swung laterally about a fore and aft axis, which is defined by the support of the upper end of the spindle 23 on the upper end of the sleeve member 16 through the locking sector 25. The upper end of the sleeve member 16 closely embraces the upper end of the wheel spindle 23.

The cam face 42 includes a pair of lugs 51 having sloping walls 52, and a companion cam member 55 is provided with generally V-shaped notches 56 formed to receive the lugs 51. The cam member 55 is disposed about the spindle 23 below the cam member 42 and lies within an enclosing casing 57, the upper end of which bears against the flange 44 and the lower end of which is fixed, as by set screws 58, firmly and rigidly to the wheel spindle 23 so as to turn therewith. Since the casing 57 bears against the flange 44 and the latter, in turn, bears against the lower end 45 of the sleeve member 16, it will be seen that the casing 57 and the locking member 25 serve as means preventing the spindle 23 from shifting axially relative to the sleeve member 16. A spring 60 is disposed within the casing and bears at its lower end against a shoulder 61 in the casing and at its upper end against the cam member 55 so as to urge the latter into engagement with the cam member 42. The latter is fixed to the sleeve member 16 by the adjusting set screws 35 and 36, so that the spindle 23 rocks within the member 42. On the other hand, the cam member 55 is connected to rock or rotate with the spindle 23 but is capable of axial shifting movement relative thereto. This is accomplished by forming lugs 63 and 64 on the member 55 and cooperating slots 66 and 67 in the casing 57. As a result of this construction the collar 55 may move axially away from the collar 39 without requiring any axial movement of the wheel spindle 23 in the sleeve member 16. The angle of the cam faces and the strength of the spring 60 are so chosen that the spring and cams are adequate to hold the wheel spindle against rocking movement when the implement is moved in a generally forward direction. However, if the implement is turned, then the side thrust against the wheel 28 becomes appreciably greater and is sufficient to overcome the restraining force exerted by the spring 60 and associated parts. The yielding of the spring 60 therefore permits the wheel 28 to caster when making a turn.

As best shown in Figure 3, the cam lugs 51 and recesses 56 have relatively sharply inclined walls, so that once the turn is started and the wheel 28 swung away from its center position, the lower ends of the lugs 51 ride up onto the upper flat portion of the member 55 and there is no further resistance to castering or lateral swinging of the rear wheel. This enables the desired turning to be made with ease, with the wheel 28 in a trailing position without constantly tending to return to its middle position. However, as the turn is completed and the implement comes around toward its normal working position, the cam lugs 51 start to enter the V-shaped notches 56 and thus aid in swinging the wheel back to operating position after the turn is completed. It will be noted that the spring and shiftable cam are enclosed within the casing 57 and hence may be adequately lubricated so as to insure responsive action. Further, the wheel spindle does not shift vertically in the sleeve section 16 and hence there is no interference with the proper control of the wheel, as might otherwise be experienced if dirt, dust and the like collected about the upper or lower end of the spindle and the latter were required to shift vertically every time it was desired to permit the rear wheel 28 to caster.

While I have shown and described above the preferred structure in which the principles of the present invention have been incorporated, it is to be understood that my invention is not to be limited to the particular means shown and described above, but that, in fact, widely different means may be employed in the practice of the broader aspects of my invention.

What I claim, therefore, and desire to secure by Letters Patent is:

1. In an agricultural machine, a pair of members connected together for rocking movement and for lateral movement, one with respect to the other, about an axis, a pair of cams surrounding one of said members, means connecting one of said cams with said one member for rocking movement therewith and for axial movement relative thereto, means for holding said cams against each other, the adjacent surfaces of said cams being formed whereby said one member is yieldingly held in a given position about said axis relative to the other member, and means connecting said other cam with said other member so as to hold the same against axial displacement and rocking movement, said means serving to shift said other cam member laterally relative to said other member so as to adjust the lateral position of said one member relative to said other member.

2. In an agricultural machine, a pair of members connected for lateral and rocking movement about an axis, one with respect to the other, biased cam means for yieldingly holding said members in a given position about said axis so as to restrain rocking movement of one relative to the other, and means for shifting said cam means laterally to adjust the lateral position of one member relative to the other.

3. In an agricultural machine, a sleeve member, a spindle member journaled for rocking movement therein and capable of lateral movement relative thereto, means for yieldingly restraining rocking movement of one member with respect to the other, and means for shifting said spindle member relative to said sleeve member to adjust the lateral position of one relative to the other.

4. A wheel support comprising a sleeve member, a spindle journaled therein, said sleeve closely embracing said spindle member at one point and flaring outwardly from said point, adjustable means engaging said spindle and said sleeve at points on the flared portion of said sleeve for adjusting the angular position of said spindle relative to the axis of said sleeve, said adjustable means including a collar having a cam surface, and a biased cam member connected to rotate with and to move axially relative to said spindle and engageable with the cam surface on said collar for yieldingly restraining rotation of said spindle about said axis relative to said sleeve member.

5. In an agricultural machine, a wheel support comprising a sleeve, a spindle journaled for rocking movement therein, a first cam member having a cam face and fixed to said sleeve, a casing fixed to said spindle and having an enlarged section, a second cam member having a cooperating cam face and disposed about said spindle in said enlarged casing section, cooperating means on said casing section and said second cam member to prevent the latter turning in said section but accommodating axial movement thereof, and spring means seated between said second cam member and the bottom of said enlarged casing section for resiliently holding said cam faces together, said faces being formed so as to restrain rocking movement of said spindle.

6. In an agricultural machine, a wheel support comprising a spindle, a member in which said spindle is journaled for rocking movement about an axis, a stationary cam member surrounding said spindle, an axially shiftable cam member, a casing surrounding said spindle and shiftable cam member, means fixing said casing to said spindle, means for urging said shiftable cam section into engagement with said stationary cam section, and means on the shiftable cam section and said casing for accommodating axial movement of said shiftable cam section but preventing rotation of the latter relative to said spindle.

7. In an agricultural machine, a wheel support comprising a spindle, a member in which said spindle is journaled for rocking movement, means to hold said member against rotation with said spindle, said member having a cam face, a cam section surrounding said spindle and also having a cam face engageable with said first mentioned cam face, a member fixed to said spindle, lug and slot means on said last mentioned member and said cam section for accommodating axial movement of the latter but preventing said cam section from rotating relative to said spindle, and spring means reacting against said last mentioned member and said cam section for yieldingly holding said cam faces in engagement.

8. In an agricultural machine, a wheel support comprising a wheel spindle, a sleeve member in which said spindle is journaled for rocking movement, a stationary cam member carried at the lower end of said sleeve member and having a radially outwardly extending flange and a downwardly facing cam element, a casing fixed to said spindle below said sleeve member and having a portion engageable with said radially outwardly extending flange, a second cam member axially shiftable relative to said spindle within said casing and having a cam element cooperating with the cam element on said first cam member, means on said second cam member on said casing for preventing said second cam member from rotating relative to said spindle but accommodating axial movement of the second cam member away from and toward the first cam member, and means surrounding said spindle and disposed within said casing for yieldingly holding said cam members together so as to yieldingly restrain rocking of said spindle in said sleeve member.

9. In an agricultural implement, a pair of members connected for relative movement one with respect to the other about an axis and also for relative movement generally transversely of said axis, a pair of interengaging cams, means for yieldingly holding said cams in engagement, means for causing one of said cams to move about said axis with one of said members, and common means for causing the other cam to move with the other of said members and for adjusting the transverse position of said other cam relative to said other member.

10. In an agricultural implement, a pair of members connected for both movement about an axis and generally lateral movement transversely of said axis, a pair of cams, one carried by one of said members and held against axial displacement relative thereto but mounted for lateral movement, means connecting the other cam with the other member for movement therewith about said axis but providing for axial displacement of said other cam relative to said other member, said cams being formed whereby said other member passes through both cams, means resiliently urging said cams into engagement to control the movement of one member with respect to the other about said axis, and means carried by said one member for adjusting the lateral position of said first cam so as to adjust the lateral position of one member relative to the other.

11. In an agricultural implement, a pair of members connected for both rocking movement about an axis and for generally lateral movement transversely of said axis, a pair of cams, one carried by one of said members and held against axial displacement relative thereto but mounted for lateral movement, means connecting the other cam with the other member for rocking movement therewith about said axis but providing for axial displacement of said other cam relative to said other member, said cams being formed whereby said other member passes through both cams, means disposed about said other member and acting against said other cam for forcing it into engagement with said one cam so as to control the rocking movement of one member relative to the other, a casing surrounding said other member, said other cam and said last mentioned means, said casing normally engaging said one cam whereby the axially movable cam and the means acting against it are enclosed and protected from dirt and the like, and means carried by said one member and acting against said one cam for shifting the position of the latter and said other member relative to said one member and holding said one cam against axial displacement.

12. In an agricultural machine, a wheel support comprising a spindle, a sleeve member in which said spindle is mounted for both lateral movement and movement about the general axis of said sleeve member, a flanged member disposed in substantially close fitting relation about said spindle and having a flange engaging the lower end of said sleeve member, said flanged member being movable laterally relative to said sleeve member to adjust the lateral position of said spindle, means for fixing said flanged member to said sleeve member in laterally adjusted position, and a member fixed to said spindle to move therewith about said axis and engageable with said flanged member, whereby said spindle carried member moves relative to said flanged member when the spindle moves relative to said sleeve member about said axis and said flanged member moves laterally relative to said sleeve member when the lateral position of said spindle relative to the sleeve member is adjusted.

13. In an agricultural implement or the like, a pair of members, one of which is mounted to rock in the other, a casing fixed to said one member and rotatable relative to the other, and biased cam means disposed in said casing and including a part engageable with said other member for holding the rocking member in a given position relative to the other.

14. In an agricultural implement, a sleeve member, a spindle mounted for rocking movement therein, a casing fixed to said spindle and movably engaging one end of the sleeve member, and biased cam means including a part fixed to said end of the sleeve member, a second part connected for axial movement in said casing but held against rotation relative thereto, and spring biasing means acting between said casing and said second cam part for urging it toward said first cam part.

15. In an agricultural implement, a pair of members connected for relative movement one with respect to the other about an axis and also for relative movement generally transversely of said axis, a pair of interengaging cams, one carried by one of said members and the other carried by the other member, means for adjusting the lateral position of one of the cams with respect to the member by which it is carried, means for causing the other cam to rock with the other member, and means for yieldingly holding said cams in engagement.

16. In an agricultural implement, a spindle, a part in which said spindle is disposed for rocking movement, a casing enclosing a portion of said spindle and fixed at one end to the latter, said casing at its other end rockably engaging said part, and biased means disposed within said casing for yieldingly restraining movement of said spindle relative to said part.

17. In an agricultural implement, a spindle, a part in which said spindle is disposed for rocking movement, a casing enclosing a portion of said spindle and fixed at one end to the latter, said casing at its other end rockably engaging said part, a cam member disposed within said casing for sliding but non-rotatable movement relative thereto, cooperating cam means on said part, and spring means within said casing for yieldingly holding said cam member against said cam means.

18. In an agricultural implement, a spindle, a sleeve member in which said spindle is disposed for rocking movement generally about the axis of said sleeve member and for lateral swinging movement generally about one end of said sleeve member, a part in which said spindle is rockingly disposed, means for adjustably fixing said part to the other end of said sleeve member, a casing enclosing a portion of said spindle and fixed at one end to the latter, said casing at its other end rockably engaging said part, a cam member disposed within said casing for sliding but non-rotatable movement relative thereto, cooperating cam means on said part, and spring means within said casing for yieldingly holding said cam member against said cam means.

19. In an agricultural machine, a wheel support comprising a spindle, a sleeve member in which said spindle is mounted for both lateral movement and movement about the general axis of said sleeve member, a flanged member disposed in substantially close fitting relation about said spindle and having a flange engaging the lower end of said sleeve member, said flanged member being movable laterally relative to said sleeve member to adjust the lateral position of said spindle, means for fixing said flanged member to said sleeve member in laterally adjusted position, and biased means connected between said spindle and flanged member to yieldingly restrain rocking movement of said spindle in said flanged member in any lateral position of the latter relative to said sleeve member.

20. The invention set forth in claim 19, further characterized by a casing surrounding said biased means and contacting the flange of said flanged member.

21. In an agricultural implement, a wheel spindle, a part in which said spindle is disposed for rocking movement, a casing enclosing a portion of said spindle and fixed at one end to the latter, said casing at its other end rockably engaging said part, and biased means disposed within said casing for yieldingly restraining movement of said spindle relative to said part, said cam means being formed so that after said wheel spindle is turned through a limited extent out of its normal position, said cam means becomes ineffective until said wheel spindle is returned substantially to its normal position.

CARL G. STRANDLUND.